(12) United States Patent
Sakamaki et al.

(10) Patent No.: US 6,902,171 B2
(45) Date of Patent: Jun. 7, 2005

(54) CHUCK DEVICE

(75) Inventors: Kazuo Sakamaki, Ojiya (JP); Akira Sakamaki, Ojiya (JP); Chokichi Sato, Ojiya (JP); Tadashi Taniguchi, Ojiya (JP)

(73) Assignee: Yukiwa Seiko Kabushiki Kaisha, Niigata-ken (JP)

( * ) Notice: Subject to any disclaimer, the term of this patent is extended or adjusted under 35 U.S.C. 154(b) by 255 days.

(21) Appl. No.: 10/211,275

(22) Filed: Aug. 5, 2002

(65) Prior Publication Data

US 2003/0141676 A1 Jul. 31, 2003

(30) Foreign Application Priority Data

Jan. 31, 2002 (JP) .................................. 2002-024495

(51) Int. Cl.⁷ ............................................. B23B 31/12
(52) U.S. Cl. ....................... 279/62; 279/140; 279/902
(58) Field of Search .............................. 279/60, 61, 62, 279/63, 64, 65, 140, 157, 902

(56) References Cited

U.S. PATENT DOCUMENTS

| | | | | |
|---|---|---|---|---|
| 3,237,955 A | * | 3/1966 | Haviland et al. ............. | 279/63 |
| 5,322,303 A | * | 6/1994 | Nakamura ..................... | 279/62 |
| 5,458,345 A | | 10/1995 | Amyot | |
| 5,716,057 A | | 2/1998 | Wright, Jr. et al. | |
| 5,765,839 A | | 6/1998 | Rohm | |
| 5,829,761 A | | 11/1998 | Rohm | |
| 6,095,530 A | * | 8/2000 | Rohm .......................... | 279/62 |
| 6,129,363 A | * | 10/2000 | Mack ........................... | 279/62 |
| 6,517,088 B1 | * | 2/2003 | Rohm .......................... | 279/62 |
| 6,572,119 B2 | * | 6/2003 | Selb ............................. | 279/52 |
| 6,581,942 B2 | * | 6/2003 | Rohm .......................... | 279/62 |
| 2003/0137113 A1 | | 7/2003 | Sakamaki et al. | |

FOREIGN PATENT DOCUMENTS

| | | |
|---|---|---|
| DE | 4438991 | 10/1994 |
| EP | 0710518 | 4/1995 |
| FR | 2702975 | 3/1993 |

* cited by examiner

Primary Examiner—Daniel W. Howell
(74) Attorney, Agent, or Firm—Sughrue Mion, PLLC

(57) ABSTRACT

To provide a chuck device for preventing the loosening of the fastening condition, a plurality of claws inserted into a hole provided at an end of a body are opened, closed and slid by the rotation of a rotary sleeve and a tool is clamped by means of the claws. A coating that is hard and has a low frictional coefficient as much as possible is applied to an inner surface of the hole.

8 Claims, 5 Drawing Sheets

CHUCK DEVICE

BACKGROUND OF THE INVENTION

1. Field of the Invention

The present invention relates to a chuck device for clamping a tool.

2. Description of the Related Art

Recently, there is a strong demand of reducing weight for a chuck device. It is proposed to form a body of light alloy such as aluminum. Incidentally, the structure according to the related art is the same as that of a first embodiment of the present invention. Accordingly, the structure of the related art will be described with reference to FIGS. 1 to 4.

For example, a chuck device with a loosening preventing mechanism has been proposed in which a plurality of claws 3 inserted into a hole 2a provided at an end of a body 2 are opened, closed and slid by the rotation of a rotary sleeve 1 and a tool 4 is clamped by means of the claws 3, wherein an annular ratchet wheel 5 is provided on the body 2, an annular nut member 6 to be engaged with the claws 3 and to be rotated together with the rotary sleeve 1 is fitted in the body 2 inside of the rotary sleeve 1, a retainer spring member 7 detachably retained with a tooth of the ratchet wheel 5 is arranged outside of the ratchet wheel 5, the retainer spring member 7 is arranged to rotate around the ratchet wheel 5 in accordance with the rotation of the nut member 6, the retainer spring member 7 is mounted on the nut member 6 by convex/concave engagement means, and a retainer portion keeps a condition that the ratchet wheel 5 and the retainer spring member 7 are retained to each other and a condition that the engagement between the ratchet wheel 5 and the retainer spring member 7 is released.

In such a chuck device, if the body is made of light alloy such as aluminum, the ratchet wheel is necessarily made of light alloy.

Conventionally, if the body is made of iron, in view of rust-proof property, nickel plate is applied to the body. However, in the case where the body is made of light alloy such as aluminum, there is no problem such as rust and hence the plating process is unnecessary.

However, studying various aspects, it has been confirmed that, even if the body is made of light alloy such as aluminum, unless the plating process is performed, the ratchet teeth of the ratchet wheel are worn due to repeated and continuous engagement between the retainer spring made of steel and the ratchet teeth, so that the loosening preventing mechanism does not work, disadvantageously. Furthermore, it has been confirmed that in the case where the surface of the body is coated, a coating is applied also to the inner surface of a hole of the body whereby the excellent result is obtained.

SUMMARY OF THE INVENTION

In order to overcome the above-noted defects inherent in the prior art, an object of the present invention is to provide a novel chuck device.

In order to attain this and other objects, according to a first aspect of the present invention, there is provided a chuck device in which a plurality of claws inserted into a hole provided at an end of a body are opened, closed and slid by the rotation of a rotary sleeve and a tool is clamped by means of the claws, characterized in that a coating that is hard and has a low frictional coefficient as much as possible is applied to an inner surface of said hole.

In the chuck device according to the first aspect, according to a second aspect, the body is made of light weight material.

Also, in the chuck device according to the first or second aspect, according to a third aspect, the light weight material is selected from the group essentially consisting of aluminum, magnesium, titanium or alloy thereof, synthetic resin and fiber reinforced resin.

Also, according a fourth aspect of the invention, there is provided a chuck device in which a plurality of claws inserted into a hole provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, a retainer spring member detachably retained with a tooth of the ratchet wheel is arranged outside of the ratchet wheel, the retainer spring member is arranged to rotate around the ratchet wheel in accordance with the rotation of the nut member, the retainer spring member is mounted on the nut member by convex/concave engagement means, a retainer portion keeps a condition that the ratchet wheel and the retainer spring member are retained to each other and a condition that the engagement between the ratchet wheel and the retainer spring member is released, the body is made of light material selected from the group essentially consisting of aluminum and aluminum alloy, and a coating that is hard and has a low frictional coefficient as much as possible is applied to a surface of the body and an inner surface of the hole.

In the chuck device according to the fourth aspect, according to a fifth aspect, the retainer portion keeps the retainer spring member in a predetermined position to thereby keep the condition that the ratchet wheel and the retainer spring member are retained to each other and the condition that the engagement between the ratchet wheel and the retainer spring member is released.

Also, according to a sixth aspect of the invention, there is provided a chuck device in which a plurality of claws inserted into a hole provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, a retainer spring member detachably retained with a tooth of the ratchet wheel is arranged outside of the ratchet wheel, the retainer spring member is composed of two spring members, one of the retainer spring members is adapted to function the retention effect with the ratchet wheel, other retainer spring member keeps a position of the retainer spring member by maintaining the position of the rotary sleeve, the retainer spring members are arranged to rotate around the ratchet wheel in accordance with the rotation of the nut member, the retainer spring members are mounted on the nut member by convex/concave engagement means, a retainer portion keeps a condition that the ratchet wheel and the retainer spring member are retained to each other and a condition that the engagement between the ratchet wheel and the retainer spring member is released, the retainer portion is disposed between the body and the rotary sleeve and defined by the retainer spring member and an inner surface of the rotary member, the body is made of light material selected from the group essentially consisting of aluminum and aluminum alloy, and a coating that is hard and has a low frictional coefficient as much as possible is applied to a surface of the body and an inner surface of the hole.

Also, in the chuck device according to the sixth aspect, according to a seventh aspect, the retainer spring member and the rotary sleeve are fitted with each other by concave/convex engagement to thereby keep the condition that the ratchet wheel and the retainer spring member are retained to each other and the condition that the engagement between the ratchet wheel and the retainer spring member is released.

OPERATION AND EFFECT OF THE INVENTION

In the chuck device according to the present invention, the coating that is hard and has a low friction coefficient as much as possible is applied to the inner surface of the hole through which the claws are slidingly moved whereby the sliding movement of the claws are enhanced and correspondingly thereto, the grip force of the tool is exhibited well.

Since the present invention is thus summarized, it is possible to provide the chuck device that may grip the tool well.

DESCRIPTION OF THE PREFERRED EMBODIMENTS

Figure 1:
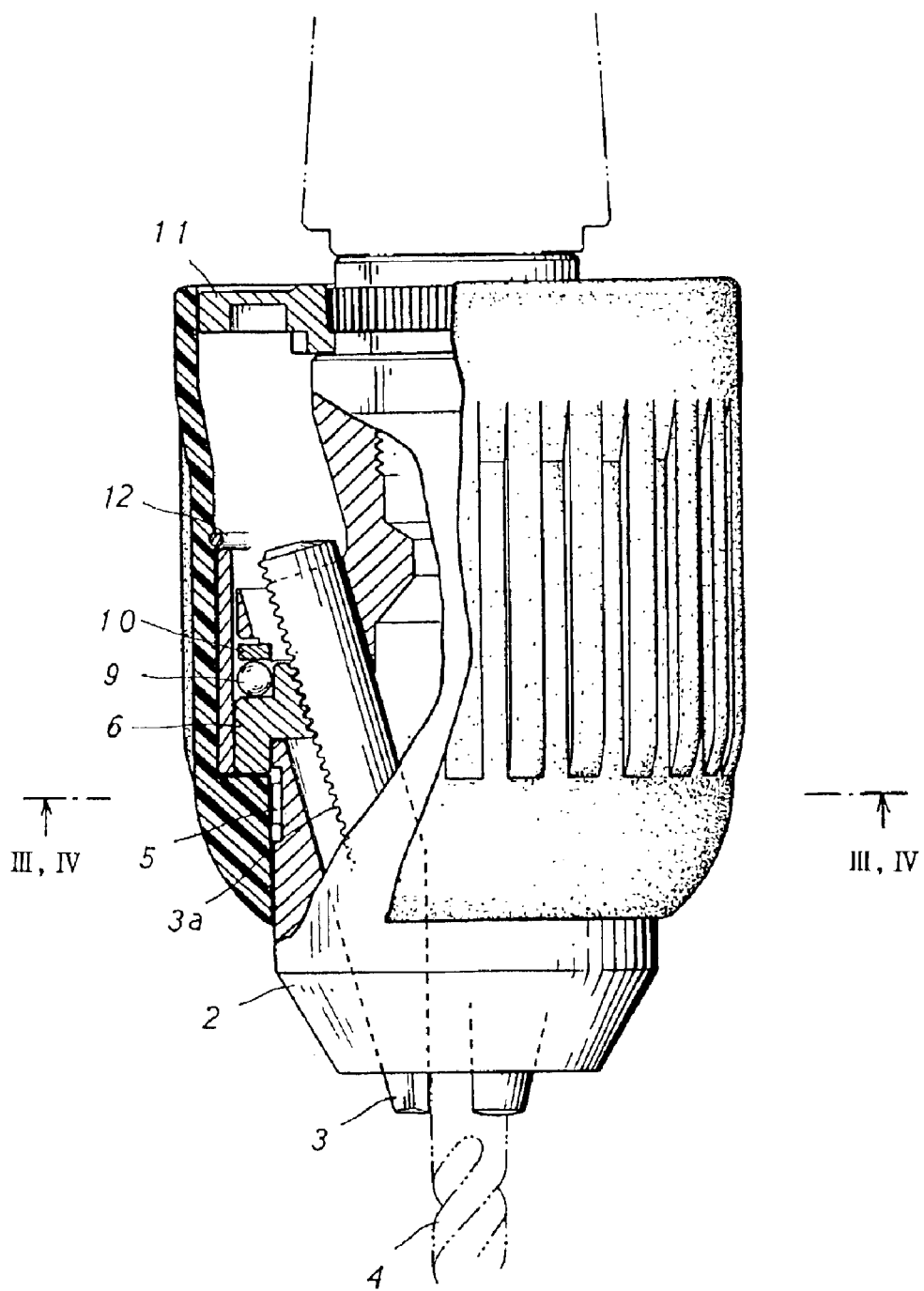
FIG. 1 is a partially fragmentary frontal view showing a device according to a first embodiment of the invention.

FIGS. 1 to 4 show a chuck device used for an electric power rotary tool such as a so-called hummer drill, a vibration drill and a driver drill for imparting vibration or shock according to an embodiment of the present invention, which will now be described.

Light material such as aluminum, magnesium, titanium and alloy thereof or synthetic resin or fiber reinforced resin is used for the body 2. Incidentally, the aluminum alloy is used in this embodiment.

Three claws 3 are provided obliquely in a hole 2a formed in a body 2. An annular nut member 6 that is to engage with a screw portion 3a formed on an outer surface of the claws 3 is provided and engaged with the claws 3.

The nut member 6 is a split nut member and its shape is maintained by means of a shape retainer ring 8.

A coating that is hard and has a low frictional coefficient is applied to the body 2. Accordingly, the coating is applied also to ratchet teeth 5 and a hole 2a through which claws 3 are slidingly moved.

More specifically, this coating may be selected from "hard Ulmite", Trade Name "Taflum" (made by Mitsubishi Material Co., Ltd.), Trade Name "Lubnik" (made by Mitsubishi Material Co., ltd.) or the like that is hard and superior in lubrication. Incidentally, the thickness of the coating is preferably in the range of 2 to 60 micron meters.

The body 2 is hardly damaged by this coating. Also, the wear of the ratchet teeth 5 is prevented. Furthermore, the engagement and disengagement between the ratchet teeth 5 and the retainer spring member 7 are smoothly performed. The sliding movement of the claws 3 within the hole 2a is smoothly performed.

Incidentally, if the above-described coating is applied also to the nut member 6 and the claws 3, the rotation of the nut member 6 may be smoothly performed.

Four projections 6a, 6b, 6c and 6d on which a retainer spring member 7 is to be mounted to rotate together with the nut member 6 are provided on the nut member 6. These projections 6a, 6b, 6c and 6d are provided on the nut member 6 that is a necessary member. It is therefore unnecessary to provide any special member for providing the projecting members 6a, 6b, 6c and 6d to thereby simplify the structure according to this embodiment.

Also, annular ratchet teeth 5 that are to engage with a tip end retainer portion 7' of the retainer spring member 7 are formed on the body 2 at a front portion of the nut member 6. The tip end retainer portion 7' and the ratchet teeth 5 are engaged with each other to realize the condition that the nut member 6 is rotatable only in one direction (reverse rotation disabling condition).

Reference numeral 9 denotes a steel ball. Numeral 10 denotes a steel ball receiver. Since this steel ball receiver 10 has elasticity, a rotary sleeve 1 is prevented from rotating in the fastening direction more than necessary by the vibration or the shock torque of the electric power rotary tool.

The retainer spring member 7 is made of metal (iron, steel or the like) and is arranged under the condition that the retainer spring is supported to an inner surface of the rotary sleeve 1 around the ratchet teeth 5. Reference character 1b and 1e denote projections for transmitting the rotational force of the rotary sleeve 1 to the nut member 6.

Figure 2:
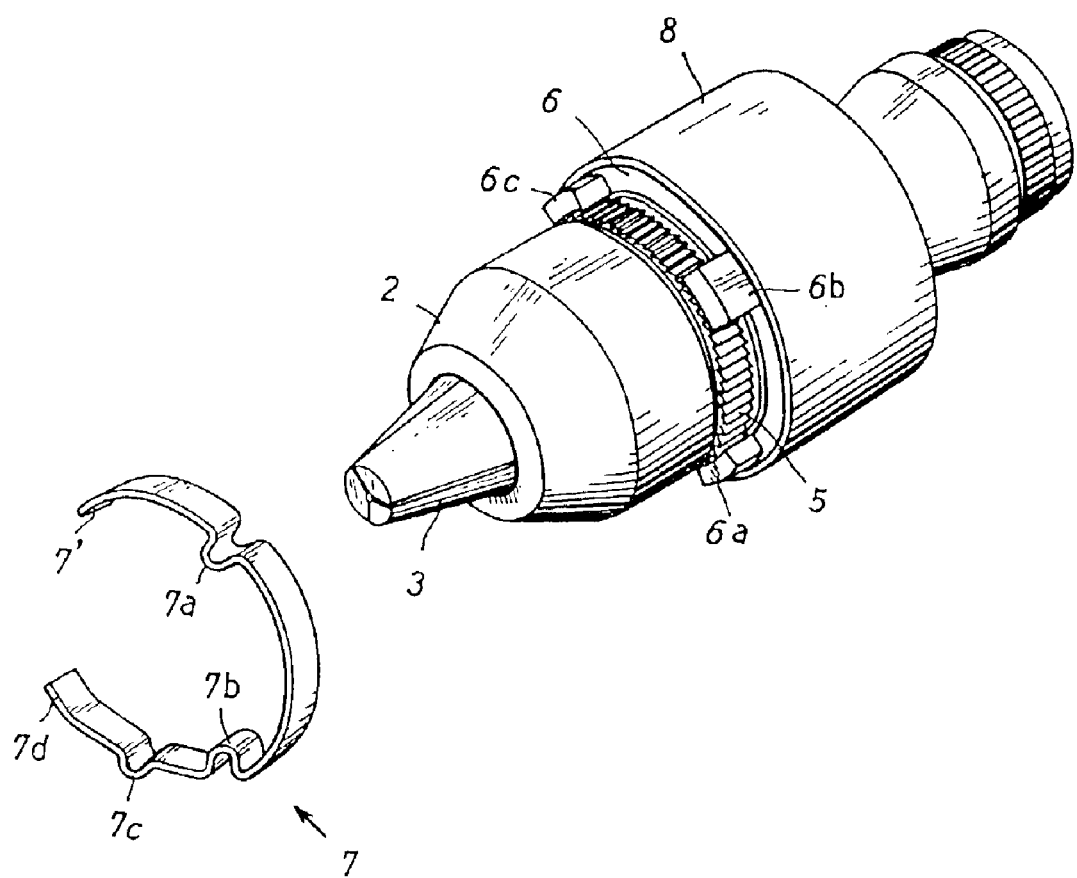
FIG. 2 is an exploded perspective view showing a primary part of the device shown in FIG. 1.
Figure 3:
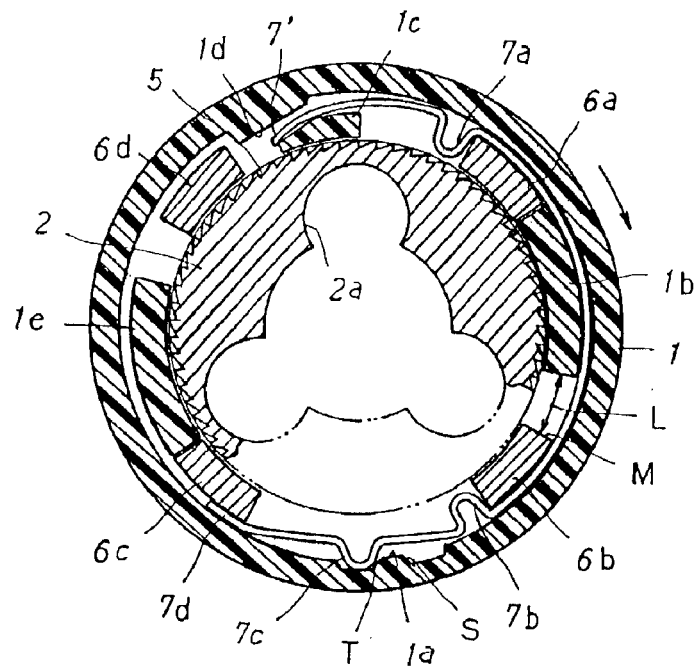
FIG. 3 is a cross-sectional view taken along the line III—III of FIG. 1 for illustrating the operation of the device according to the first embodiment.
Figure 4:
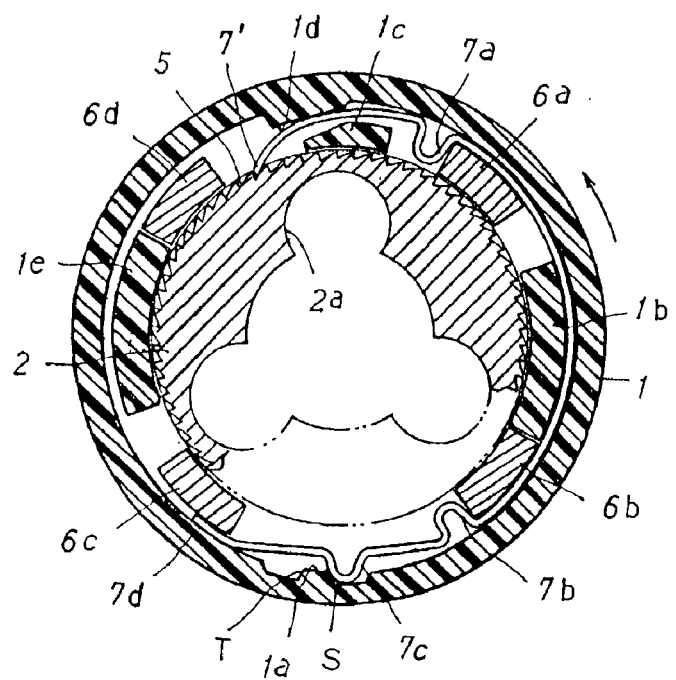
FIG. 4 is a cross-sectional view taken along the line IV—IV of FIG. 1 for illustrating the operation of the device according to the first embodiment.

As shown in FIGS. 2, 3 and 4, three projections 7a, 7b and 7c and the tip end retainer portion 7' to be retained at the ratchet teeth 5 are provided in the retainer spring member 7. Also, a contact portion 7d for contacting the projection 6c to exhibit the good spring force is provided at a rear end portion of the retainer spring member 7 (The opposite side of the contact portion 7d is received by the projection 6b). The retainer spring member 7 is mounted so as to rotate together with the nut member 6 by means of the projections 7a and 7b of the retainer spring member 7 and the projections 6a and 6b of the above-described nut member 6.

In this embodiment, since the retainer spring member 7, the projections 1b and 1e and the projections 6a, 6b, 6c and 6d are provided on the same circumference, it is thus possible to design a compact system.

Incidentally, how to mount the retainer spring member 7 and the nut member 6 is not limited to the above-described structure if a structure in which the two components may rotate together is taken.

An intermediate member 1c for performing the release of the engagement between the tip end retainer portion 7' of the retainer spring member 7 and the ratchet teeth 5 is provided on the inner surface of the rotary sleeve 1. The tip end retainer portion '7 is received by a tip end taper surface of this intermediate member 1c to thereby positively perform the release of the threaded engagement between the tip end retainer portion 7' and the ratchet teeth 5.

Also, a depression portion 1d for depressing the tip end retainer portion 7' of the retainer spring member 7 to maintain the engagement condition between the tip end retainer portion 7' and the ratchet teeth 5 is provided on the inner surface of the rotary sleeve 1.

The rotary sleeve 1 whose tip end is to be received by the body 2 is fitted in the nut member 6. The rotary sleeve 1 is rotated together with the nut member 6. However, when a predetermined load is applied to the rotation of the nut member 6, the rotary sleeve 1 may rotate through a predetermined angle to the nut member 6.

The rotation of the rotary sleeve 1 through the predetermined angle to the nut member 6 is defined between the projection 6a and the projection 6b, more specifically, a distance L in FIG. 3. Accordingly, when the rotary sleeve 1 is rotated so that the load is applied, the projection 1a of the rotary sleeve 1 rides over the projection 7c against the spring force of the retainer spring member 7 and the end face of the projection 1b is brought into contact with the end face M of the projection 6b (the end face of the projection 1e is brought into the end face of the projection 6d in the same manner) whereby the rotary sleeve 1 and the nut member 6 are integrated together to perform the increase of the fastening.

As far as the projection 1a rides over the projection 7c of the retainer spring member 7 against the spring force, due to the provision of the projection 1a, there is no fear that the rotary sleeve 1 is rotated in the loosening direction. Accordingly, it is possible to exhibit the loosening prevention effect without fail. Incidentally, it is possible to set the loosening prevention force by the spring force of the retainer spring member 7, particularly, the spring force between the projection 7b and the contact portion 7d and the shape of the projection 1a and the projection 7c.

Furthermore, slippage preventing projections is formed on the outer surface of the rotary sleeve 1 (made of synthetic resin). Also, the rotary sleeve 1 is received at one end to the body 2 and at the other end to a receiver member 11 provided on the body 2.

Reference numeral 12 denotes a C-shaped pull-apart preventing ring for the rotary sleeve 1.

With such an arrangement, the following effect is obtained according to this embodiment.

The tool 4 is clamped by means of the claws 3. When the rotary sleeve 1 is rotated, the nut member 6 is rotated together with the rotary sleeve 1 until a predetermined load is applied to the rotary sleeve 1. Accordingly, the retainer spring member 7 is also rotated around the ratchet teeth 5.

When the rotary sleeve 1 is rotated to a predetermined position (position where the claws 3 are brought into contact with the tool 4), a predetermined load is applied to the rotary sleeve 1 (condition shown in FIG. 3). When the rotary sleeve 1 is rotated against the spring force in the direction indicated by an arrow in FIG. 3 from this condition, the rotary sleeve 1 is rotated to the nut member 6 so that the intermediate member 1c receiving the tip end retainer portion 7' of the retainer spring member 7 is moved and the depression portion 1d of the rotary sleeve 1 depresses the tip end retainer portion 7' to thereby retain the tip end retainer portion 7' to the ratchet tooth 5. Furthermore, the projection 1a of the rotary sleeve 1 rides over the projection 7c of the retainer spring member 7 (the projection 7c is positioned from the T side to the S side of FIG. 3). The projection 1b is brought into contact with the end face M of the projection 6b and in the same manner, the projection 1e is brought into contact with the projection 6d so that the rotary sleeve 1 and the nut member 6 are integrated. When the rotary sleeve 1 is further rotated, the tip end retainer portion 7' of the retainer spring member 7 retained at the ratchet tooth 5 rides over the ratchet teeth 5 one by one by the leaf spring effect to be retained at the predetermined ratchet tooth 5. Under this condition, the reverse rotation no longer takes place due to the ratchet tooth 5. The rotational resistance of the rotary sleeve 1 is increased to complete the fastening operation as shown in FIG. 4.

Incidentally, the condition where the teeth are passed one by one means the incompletion of the fastening operation. When the fastening operation is completed, there is no ride-over of the teeth.

This fastening condition is kept by means of the projection 1a and the projection 7c.

Also, in order to release the fastening condition, the operation is performed in the opposite order. Namely, when the rotary sleeve 1 is rotated in the reverse direction, the projection 7c located on the S side (in the condition shown in FIG. 4) rides over the projection 1a. When the rotary sleeve 1 is further rotated in the direction indicated by the arrow in FIG. 4, the engagement between the tip end retainer portion 7' and the ratchet tooth 5 by the depression portion 1d is released. Furthermore, the intermediate member 1c is moved to lift up the tip end portion 7' of the retainer spring member 7. When the rotary sleeve 1 is further rotated, the fastening force of the tool 4 is loosened. This condition, i.e., the condition where the engagement between the tip end retainer portion 7' of the retainer spring member 7 and the ratchet tooth 5 is released is also maintained by means of the projection 7c and the projection 1a.

It is thus possible to provide a chuck device that may positively prevent the loosening of the fastening of the tool 4 and that is superior in durability with a simple structure according to this embodiment.

Also, in the chuck device according to the first embodiment, since the body 2 is made of light material, the body is light in weight and superior in practical applicability. Furthermore, since the above-described coating is applied to the surface of the body 2, even if the cut powder is brought into collision with the body 2, the latter is hardly damaged. Moreover, since the above-described coating is applied also to the ratchet teeth 5, the wear of the ratchet teeth 5 is prevented as much as possible. At the same time, the engagement and disengagement with the retainer spring member 7 is smoothly performed. Also, since the above-described coating is applied to the inner surface of the hole 2a of the body 2, the sliding movement of the claws 3 is performed smoothly whereby the grip of the tool 4 is smoothly performed. In particular, with the so-called hummer drill, the vibration drill, the driver drill and the like that is to impart the vibration or the shock, the vibration works in the axial direction or the rotational direction, intermittently. A baking stick takes place between the claws 3 and the inner surface of the hole 2a during the vibration. Sometimes, there is the fault in opening and closing of the claws 3. However, this defect may be overcome by this embodiment.

In the first embodiment, the intermediate member 1c is used to prevent the tip end retainer portion 7' of the retainer spring member 7 from engaging with the ratchet tooth 5 accidentally. Accordingly, under the condition where the tip end retainer portion 7' is not received by the intermediate member 1c; that is, the depression portion 1d is not brought into contact with the tip end retainer portion 7', the end tip retainer portion 7' is separated away from the ratchet teeth 5 by the elasticity of the spring. However, it is possible to take a structure where the engagement of the tip end retainer portion 7' and the ratchet tooth 5 is forcibly released.

Figure 5:
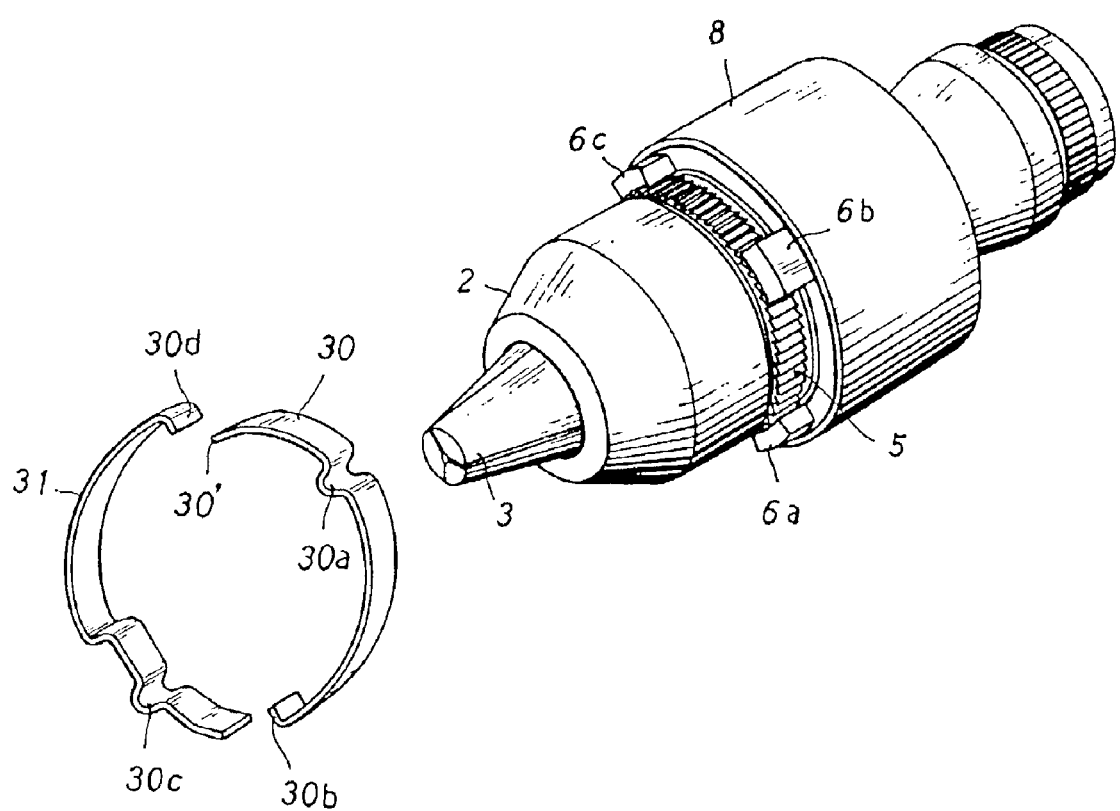
FIG. 5 is an exploded perspective view showing a primary part of a device according to a second embodiment.
Figure 6:
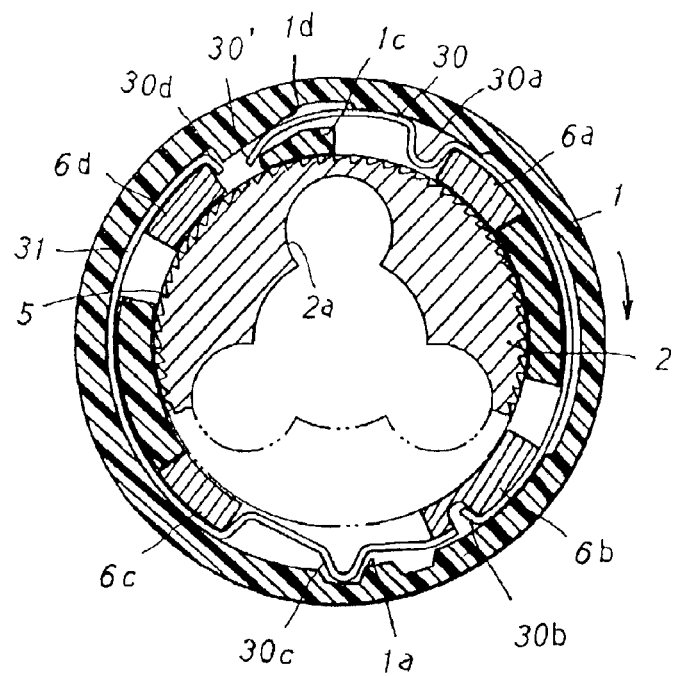
FIG. 6 is a cross-sectional view of a device according to a second embodiment corresponding to FIG. 3.
Figure 7:
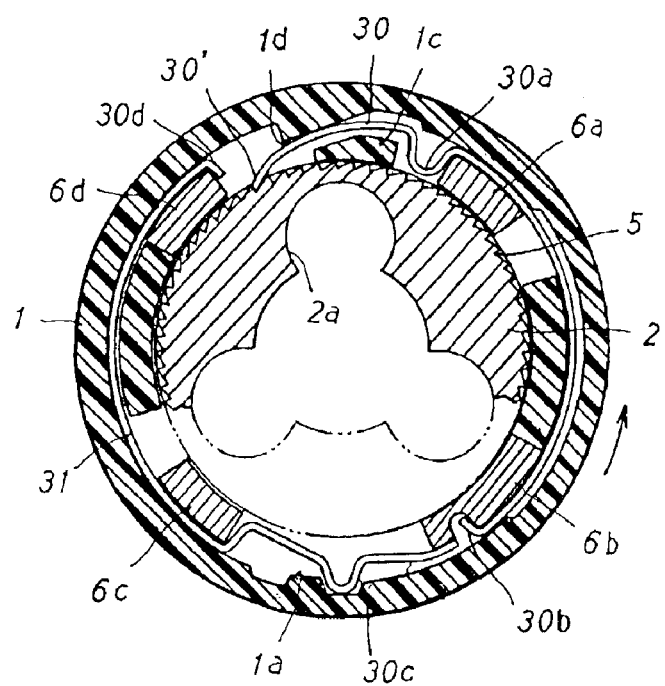
FIG. 7 is a cross-sectional view of a device according to the second embodiment corresponding to FIG. 4.

FIGS. 5 to 7 show a second embodiment of the present invention. This will now be described.

In the second embodiment, the retainer spring member 7 of the first embodiment is composed of two retainer spring members 30 and 31. One of the retainer spring members 30 functions to retain the ratchet teeth 5 and the other retainer spring member 31 functions to maintain the position of the rotary sleeve 1 to thereby retain the retainer spring member 30 in a predetermined position. Thus, according to the second embodiment, the retention function of the ratchet teeth 5 and the retainer maintenance function and the retention release function of the ratchet teeth 5 are separated to the different springs unlike the first embodiment. The other structure is the same as that of the first embodiment.

Reference character 30' denotes a portion corresponding to the tip end retainer portion 7' of the first embodiment, character 30a denotes a portion corresponding to the projection 7a of the first embodiment, character 30b denotes a retainer portion corresponding the projection 7b of the first embodiment, character 30c denotes a portion corresponding to the projection 7c of the first embodiment and character 30d denotes a retainer portion to be fitted with the projection 6d.

What is claimed is:

1. A chuck device in which a plurality of claws inserted into a hole provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, a retainer spring member detachably retained with a tooth of the ratchet wheel is arranged outside of the ratchet wheel, the retainer spring member is arranged to rotate around the ratchet wheel in accordance with the rotation of the nut member, the retainer spring member is mounted on the nut member by convex/concave engagement means, a retainer portion keeps a condition that the ratchet wheel and the retainer spring member are retained to each other and a condition that the engagement between the ratchet wheel and the retainer spring member is released, the retainer portion is disposed between the body and the rotary sleeve and defined by the retainer spring member and an inner surface of the rotary member; and a coating that is hard and has a low frictional coefficient as much as possible is applied to a surface of said body, an inner surface of said hole and said ratchet wheel.

2. A chuck device in which a plurality of claws inserted into a hole provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, a retainer spring member detachably retained with a tooth of the ratchet wheel is arranged outside of the ratchet wheel, the retainer spring member is composed of two spring members, one of the retainer spring members (30) is adapted to function the retention effect with the ratchet wheel, and the other retainer spring member (31) keeps a position of the one of the retainer spring members (30) by maintaining the position of the rotary sleeve, the retainer spring members (30, 31) are arranged to rotate around the ratchet wheel in accordance with the rotation of the nut member, the retainer spring members (30, 31) are mounted on the nut member by convex/concave engagement means, a retainer portion keeps a condition that the ratchet wheel and the one of the retainer spring members (30) are retained to each other and a condition that the engagement between the ratchet wheel and the one of the retainer spring members (30) is released, the retainer portion is disposed between the body and the rotary sleeve and defined by the other of the retainer spring members (31) and an inner surface of the rotary member, and a coating that is hard and has a low frictional coefficient as much as possible is applied to a surface of said body, an inner surface of said hole and said ratchet wheel.

3. The chuck device according to claim 1 or 2, wherein the body is made of light weight material.

4. The chuck device according to claim 3, wherein the light weight material is selected from the group essentially consisting of aluminum, magnesium, titanium or alloy thereof, synthetic resin and fiber reinforced resin.

5. The chuck device according to claim 4, wherein the retainer portion keeps the retainer spring member in a predetermined position to thereby keep the condition that the ratchet wheel and the retainer spring member are retained to each other and the condition that the engagement between the ratchet wheel and the retainer spring member is released.

6. The chuck device according to claim 3, wherein the light weight material is selected from the group essentially consisting of aluminum, magnesium, titanium or alloy thereof, synthetic resin and fiber reinforced resin.

7. The chuck device according to claim 6 wherein the other of the retainer spring members (31) and the rotary sleeve are fitted with each other by concave/convex engagement to thereby keep the condition that the ratchet wheel and the one of the retainer spring members (30) are retained to each other and the condition that the engagement between the ratchet wheel and the one of the -retainer spring members (30) is released.

8. The chuck device according to claim 1 or 2, wherein the coating has a thickness of 2 to 60 μm.

* * * * *